Nov. 5, 1929.   A. R. WELLS   1,734,410
FASTENING DEVICE
Filed April 4, 1928

Inventor:
Albert Randall Wells

Patented Nov. 5, 1929

1,734,410

UNITED STATES PATENT OFFICE

ALBERT RANDALL WELLS, OF LONDON, ENGLAND

FASTENING DEVICE

Application filed April 4, 1928, Serial No. 267,286, and in Great Britain April 13, 1927.

This invention relates to improvements in fastening devices, designed primarily for securing together wall-board, wood-work, floor boards and like materials.

The object of the invention is to provide a fastening device which can be readily stamped from flat metal, and so formed as to provide parallel legs connected together by a cross bar to afford convenient means for driving the fastener into a piece of wood or the like.

A further object of the invention is to provide a fastening device so constructed that it may, by a blow from a hammer or similar tool, be conveniently driven into one piece of material to be fastened to another, whereby to anchor the fastener, and thereafter, by pressure or blows on another piece of material embed the upper portions of the legs in said secured piece of material, and thus secure the two pieces together.

A further object of the invention is to provide a fastening device with beveled terminals, whereby when driving the device into a piece of material, or a piece of material is pressed on the device, the legs will be deflected to anchor the legs in the material.

The invention also comprehends improvements in the details of construction and arrangement of parts which will be hereinafter described and particularly pointed out in the claims.

Figure 1:
Figure 1 is an end elevation of my improved fastening device.
Figure 4:
Figure 4 is a view illustrating the fastening device shown in Figure 1 in position when securing two pieces of wood together.
Figure 2:
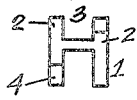
Figure 2 is a side view of the same.
Figure 3:
Figure 3 is a similar view of a slightly different form of the invention.

The numeral 1 indicates the fastening device as a whole, same comprising a pair of parallel legs 2, 2 and an intermediate cross bar 3 connecting the legs. As shown in Figure 1, the terminals of the legs are beveled, as at 4, to form sharp edges 5. The beveled terminals of the two legs, as shown in Figure 1, are on opposite faces of the legs to deflect the legs when embedded in wood, as shown in Figure 4. The beveled section of the terminals may be on the outer edges of the legs, as shown in Figure 3, so that when the legs are embedded in the wood they curve inwardly to form a binding action between the two pieces of material secured together.

Figures 5, 6:
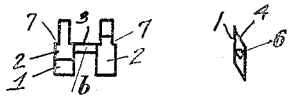
Figure 5 is a side elevation of the fastening device illustrating shoulders on the sides of the legs.
Figure 6 is a central vertical section through the construction shown in Figure 5.

If desired, the cross bar 3 may be beveled on its side faces to form a sharp edge 6, as shown in Figure 6. In Figures 5 and 6 I have also shown a further development of the invention, in that the legs above the horizontal plane of the cross bar are reduced in width to provide outer edge shoulders 7.

In use, the fastening device is driven into a piece of wood by striking the cross bar with a hammer or other tool, the device of course being made flat and of such suitable material that it will bend. Hence according to the angle and location of the bevel at the terminals of the legs, the lower portions of the latter when driven into the wood will be deflected from a vertical plane to form an anchor. The device is driven into the wood until the top surface of the cross bar is in the same plane as the surface of the piece of wood it is driven into. When the device is thus anchored, a second piece of wood is pressed or hammered down on the upper ends of the legs, and the latter are deflected and form an anchor.

When the form of the device shown in Figure 5 is used, it is evident when forcing or hammering the upper piece of wood on the legs, less resistance will be required and at the same time the lower portions of the legs will be of sufficient strength to stand the blows of the tool, incident to first driving the device in the wood to anchor it. Then, by beveling the cross bar it readily cuts into the wood when the device is driven in place.

What I claim is:

1. A fastening device comprising two parallel legs having their terminals beveled to form sharp edges, and an intermediate cross bar connecting said legs, the cross bar serving as a means to receive a blow from a tool to drive the device into the material being fastened, and the beveled sharp edges serving as a means for deflecting the legs above and below the cross bar when applying the fastener.

2. A fastening device comprising two flat parallel legs having their terminals beveled to form sharp edges, and a flat intermediate cross bar connecting said legs, the outer edges of the flat legs above the flat cross bar being reduced in width to form outer shoulders in substantial alignment with the top edge of the flat cross bar, the flat cross bar serving as a means to receive a blow from a tool to drive the device into the material being fastened, and the beveled sharp edges serving as a means for deflecting the flat legs above and below the cross bar when applying the fastener.

ALBERT RANDALL WELLS.